United States Patent
Laine et al.

(10) Patent No.: US 12,280,896 B2
(45) Date of Patent: Apr. 22, 2025

(54) METHOD FOR OPTIMISING THE ORBITAL TRANSFER OF AN ELECTRICALLY PROPELLED SPACECRAFT, AND SATELLITE USING SAID METHOD

(71) Applicant: AIRBUS DEFENCE AND SPACE SAS, Toulouse (FR)

(72) Inventors: Ivan Laine, Toulouse (FR); Eric Martin, Toulouse (FR); Marie Catherine Maag, Toulouse (FR); Jean Francois Diraison, Toulouse (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 4 days.

(21) Appl. No.: 17/926,543

(22) PCT Filed: May 19, 2021

(86) PCT No.: PCT/EP2021/063386
§ 371 (c)(1),
(2) Date: Nov. 18, 2022

(87) PCT Pub. No.: WO2021/234054
PCT Pub. Date: Nov. 25, 2021

(65) Prior Publication Data
US 2023/0211895 A1     Jul. 6, 2023

(30) Foreign Application Priority Data

May 19, 2020   (FR) ...................................... 2005113

(51) Int. Cl.
*B64G 1/00*     (2006.01)
*B64G 1/24*     (2006.01)
*B64G 1/40*     (2006.01)

(52) U.S. Cl.
CPC ........... *B64G 1/2427* (2023.08); *B64G 1/242* (2013.01); *B64G 1/405* (2013.01)

(58) Field of Classification Search
None
See application file for complete search history.

(56) References Cited

U.S. PATENT DOCUMENTS

| | | |
|---|---|---|
| 5,595,360 A | 1/1997 | Spitzer |
| 5,716,029 A * | 2/1998 | Spitzer .................. B64G 1/405 244/171.5 |

(Continued)

FOREIGN PATENT DOCUMENTS

| | | |
|---|---|---|
| EP | 1 059 232 | 12/2000 |
| EP | 2 977 321 | 1/2016 |

(Continued)

OTHER PUBLICATIONS

C.A. Kluever, "Geostationary Orbit Transfers Using Solar Electric Propulsion with Specific Impulse Modulation", Journal of Spacecraft and Rockets, vol. 41, No. 3, May 1, 2004, pp. 461-466 (6 pages).

(Continued)

*Primary Examiner* — Medhat Badawi
*Assistant Examiner* — Vicente Rodriguez
(74) *Attorney, Agent, or Firm* — Nixon & Vanderhye P.C.

(57) ABSTRACT

A method for transferring a spacecraft (10), such as an artificial satellite, from an initial elliptical orbit (30) to a final geostationary orbit (50), the spacecraft taking at least one intermediate elliptical orbit (40) propelled by electric propulsion means (12, 13), the method includes: when the spacecraft is in an intermediate orbit, a nominal thrust step (410) in which the propulsion means generate nominal thrust while the spacecraft is on at least part of a first orbital arc (41) passing through the apogee A of the intermediate orbit, (Continued)

and a minimum thrust step (420), in which the propulsion means are partly stopped or slowed while the spacecraft is on at least part (43) of a second orbital arc (42) passing through the perigee P of the intermediate orbit, the two orbital arcs being complementary.

11 Claims, 8 Drawing Sheets

(56) References Cited

U.S. PATENT DOCUMENTS

| | | | |
|---|---|---|---|
| 6,543,723 B1 | 4/2003 | Oh | |
| 7,113,851 B1* | 9/2006 | Gelon | B64G 1/244 |
| | | | 701/4 |
| 10,005,567 B2 | 6/2018 | Hache et al. | |
| 11,787,569 B2* | 10/2023 | Grover | B64G 1/242 |
| | | | 244/158.6 |
| 2003/0062452 A1* | 4/2003 | Oh | B64G 1/2427 |
| | | | 244/171.1 |
| 2012/0097796 A1* | 4/2012 | Munir | B64G 1/405 |
| | | | 244/158.6 |
| 2018/0029727 A1 | 2/2018 | Doubrere | |
| 2020/0198810 A1* | 6/2020 | Noel | B64G 1/2427 |
| 2020/0377235 A1* | 12/2020 | Wasson | B64G 1/244 |

FOREIGN PATENT DOCUMENTS

| | | |
|---|---|---|
| FR | 2 829 104 | 3/2003 |
| FR | 3 032 427 | 8/2016 |

OTHER PUBLICATIONS

International Search Report and Written Opinion of the ISA for PCT/EP2021/063386 dated Jul. 28, 2021 (with English translation of Written Opinion), 18 pages.

* cited by examiner

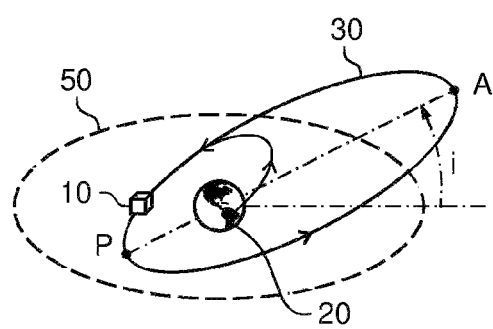
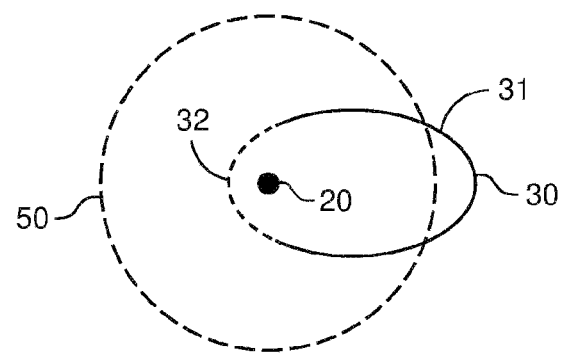
Fig. 1a  Fig. 1b
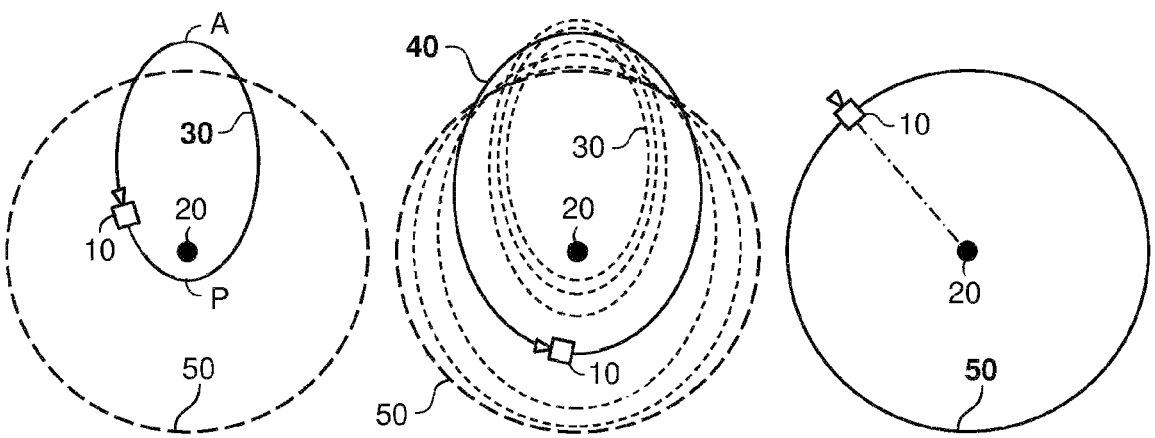
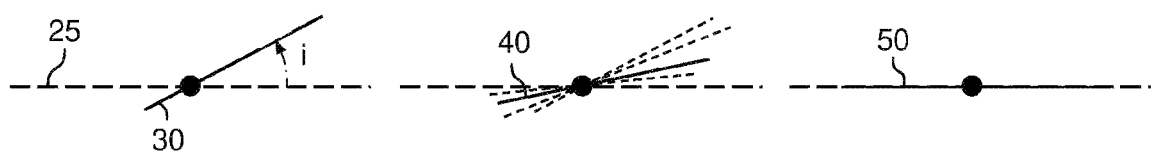
Fig. 2a  Fig. 2b  Fig. 2c

METHOD FOR OPTIMISING THE ORBITAL TRANSFER OF AN ELECTRICALLY PROPELLED SPACECRAFT, AND SATELLITE USING SAID METHOD

RELATED APPLICATION

This application is the U.S. national phase of International Application No. PCT/EP2021/063386, filed May 19, 2021, which designated the U.S. and claims priority to French patent application FR 2005113, filed May 19, 2020, the entire contents of each of which are hereby incorporated by reference.

TECHNICAL FIELD

The present invention belongs to the general field of astrodynamics, particularly spacecraft orbital transfer and stationing techniques, and more particularly relates to a method for optimising the orbital transfer of a spacecraft, such as an artificial satellite, having an electric propulsion.

Such a method applies, for example, to the orbital transfer of a telecommunications satellite between an initial elliptical orbit and a final circular orbit, optionally geostationary, of different inclination, according to an Electric Orbit Raising (EOR) approach.

PRIOR ART

In order to perform the placing into orbit of a spacecraft intended to complete a determined mission, sometimes a launch vehicle places it into a so-called injection or transfer elliptical orbit the perigee of which is close to the peak altitude of said launch vehicle and determines the altitude of the apogee depending on the speed of the spacecraft. Furthermore, the inclination of the injection orbit is generally different from that of the targeted orbit, or mission orbit, because it mainly depends on the latitude of the launch point. The spacecraft then gets to its mission orbit by executing the manoeuvres required for a given orbital transfer.

The orbital transfer may be performed in various ways, well known, depending on the specificities of each launch vehicle and of each spacecraft (injection orbital parameters, nature of the propulsion, etc.). The possible trajectories are therefore numerous and bring about varied strategies for using the energy resources of the spacecraft and for managing the duration of the transfer.

Thus, the orbital transfer has become from the beginning of space conquest a complex optimisation problem that arises naturally to industrialists of astronautics. Generally, this optimisation problem consists in determining from the possible strategies those that, between two given orbits, minimise a certain cost. More practically, this problem may be stated as follows: Given an artificial satellite in orbit about the Earth equipped with motors, satellite that we want to transfer from an initial orbit, where for example it was placed by the launch vehicle, to a final orbit, where for example said satellite is operational, at what moments must we use these motors, in which direction and with what thrust intensity in order to carry out this transfer by minimising a cost function such as the consumption of propellants or the duration of said transfer?

Even if the formulation remains the same, it is easily understood that the optimisation of an orbital transfer depends on a plurality of parameters such as the type of spacecraft, the type of propulsion used, the cost to be minimised, the space environment, etc.

By way of example, the document U.S. Pat. No. 5,595,360A describes a method for optimising the orbital transfer of a spacecraft launched into an injection orbit about a central body and oriented in a predetermined attitude, to pass this spacecraft from the injection orbit to a geosynchronous orbit. The spacecraft comprises an electric thruster, a control unit of said thruster, this control unit comprising a means for operating the thruster at apogees of intermediate orbits, to successively increase the perigees thereof. This operation continues until the semi-major axis of an intermediate orbit is practically equal to the semi-major axis of the geosynchronous orbit, to define an initial transfer orbit for the spacecraft. Subsequently, the means continuously operate the thruster to pass the spacecraft from the initial transfer orbit to the geosynchronous orbit, while maintaining the equality, in practice, of the geosynchronous semi-major axis and of the transfer orbit semi-major axis. The method proposed by this solution is similar to the standard EOR approach mentioned hereafter.

As a general rule, telecommunications satellites operating in Geostationary Equatorial Orbit (GEO) are not directly placed on this orbit by the launch vehicle. Satellites are often injected into a Geostationary Transfer Orbit (GTO) then transferred to the GEO travelling through a series of successive intermediate orbits. To carry out the necessary manoeuvres, satellites use their own propulsion system following known flight plans. The transfer from the GTO to the GEO is also dominated by the use of chemical propulsion. Recently, some satellites have been transferred or are being transferred to the GEO by means of an electric propulsion. The EOR approach is known, for the stationing of satellites by electric propulsion, which is the most recent application of plasma propulsion, having had a noteworthy impact in the space industry. Indeed, the use of plasma thrusters has made significant mass savings possible. One example of this mass saving is the VA-237 launch by Ariane 5 on 2 Jun. 2017 that carried two geostationary telecommunications satellites. Among these satellites, the Eutelsat-172B satellite designed by Airbus Defence and Space carried out its orbital transfer only by electric propulsion, and was 55% lighter than the other satellite for a similar electrical power, and therefore a similar operational capacity.

The use of the EOR instead of the chemical propulsion for the transfer phase makes it possible to reduce the mass of propellants, and therefore to increase the maximum permissible dry mass of the satellite. However, most of the solutions for optimising the electrically propelled orbital transfer continue to use chemical propulsion to carry out certain key steps of the transfer.

For example, the document U.S. Pat. No. 7,113,851B1 describes a method and a system for orbital transfer making it possible for a satellite to quickly escape the Van Allen radiation belts while minimising the payload mass and the mission life. The satellite comprises high-thrust chemical thrusters, specific high-impulse electric thrusters and a solar array. The satellite quickly exits the Van Allen radiation belts by using the chemical thrusters on apogees of intermediate orbits, from the transfer orbit initiated by a launch vehicle, to successively raise the perigees until the perigee clears said belts. The payload mass and the mission life are maximised by using electric propulsion as highlighted above.

The document US2003062452A1 describes a method for launching a satellite into orbit that optimises the mass of the satellite delivered into orbit, the satellite including chemical thrusters and electric thrusters. This method comprises a step of using a chemical thruster to pass from the transfer orbit to an intermediate orbit and a step of using an electric thruster, to raise the orbit from said intermediate orbit to a final geosynchronous orbit, during which said electric thruster is subjected to a regulation of the thrust to produce variable thrust levels in order to operate at an optimum specific impulse level to optimise the mass brought into orbit.

Nevertheless, solutions for optimising the orbital transfer only by electric propulsion exist, such as that described in the document US2012097796A1 that proposes to determine the optimum trajectory minimising the mass by simultaneously adjusting the orbital parameters.

The existing purely electric solutions remain fairly complex, with inconclusive results, and do not make it possible to cover the problematic aspects of the spacecraft mission such as radiation.

DISCLOSURE OF THE INVENTION

The aim of the present invention is to overcome the drawbacks of the prior art disclosed above, in particular the limits of the current approaches of electrically propelled orbital transfer in terms of saving propellants, prolonging the mission life and managing the constraints related to the space environment.

To this end, the object of the present invention is a method for transferring a spacecraft, such as an artificial satellite, from an initial elliptical orbit to a final orbit of said spacecraft about a body of dominating mass, such as a planet, said spacecraft taking at least one intermediate elliptical orbit propelled by electric propulsion means. This method is remarkable in that it comprises, when the spacecraft is in an intermediate orbit, a nominal thrust step, wherein the propulsion means generate a nominal thrust while said spacecraft is on at least one part of a first orbital arc passing in general through the apogee of said intermediate orbit and a reduced thrust step, wherein the propulsion means are partly stopped or slowed while said spacecraft is on at least one part of a second orbital arc passing in general through the perigee of said intermediate orbit, the two orbital arcs being complementary.

The nominal thrust and the reduced thrust may correspond to a maximum thrust and to a minimum thrust respectively.

According to a particularly advantageous embodiment, the electric propulsion means include at least one optional fixed thruster, generating a thrust of direction parallel to a Z-axis related to the spacecraft and tangential to the trajectory of said spacecraft during the transfer, and at least two deployable propulsion assemblies, generating a thrust of orientable direction and each including at least one thruster, the reduced thrust step consisting in stopping any fixed thruster and maintaining in operation one thruster per deployable propulsion assembly.

More particularly, the first orbital arc and the second orbital arc of each intermediate orbit have a symmetry in relation to a major axis of said orbit, the first arc normally having a length greater than that of the second arc.

Advantageously, the method further comprises a transition step from the nominal thrust step to the reduced thrust step and a transition step from the reduced thrust step to the nominal thrust step, each of said transition steps comprising progressive modifications of the operating mode of all or part of the electric propulsion means of the spacecraft.

Advantageously, the method is implemented by the spacecraft iteratively on a plurality of successive intermediate orbits while said spacecraft has not reached the final orbit.

According to an advantageous aspect of the invention, the nominal thrust steps and the reduced thrust steps are configured so as to optimise the consumption of propellants of the spacecraft and the duration of the transfer between the initial orbit and the final orbit. The aim of this is to prolong the mission life at constant propellant mass or to increase the dry mass of the spacecraft at constant life.

According to another aspect, for any intermediate orbit passing through an area of intense radiation, such as the Van Allen radiation belts, the nominal thrust steps and the reduced thrust steps are configured so as to minimise the duration of the transfer.

According to one embodiment, the spacecraft is a telecommunications satellite intended to be operational in a geostationary orbit, said satellite initially being placed in an injection orbit of non-zero inclination by a launch vehicle, the transfer of said satellite from the injection orbit to the geostationary orbit being performed via an Electric Orbit Raising (EOR) approach.

According to one embodiment, the electric propulsion means comprise Hall-effect thrusters.

According to another advantageous aspect of the invention, an electric battery of the spacecraft is charged by a solar array of said spacecraft during the reduced thrust step to a level greater than a charge level of said battery during the nominal thrust step, to provide an energy support to said spacecraft during the nominal thrust step.

During the minimum thrust step, the spacecraft stores energy on the battery, and during the nominal thrust step this energy is allocated to the nominal thrust.

Thus, a quantity of energy remaining in the solar array, after charging the battery during the reduced thrust step, is used to superheat the spacecraft in order to save energy during a resetting of the thermal control operations during the nominal thrust step.

Another object of the invention is a spacecraft, of artificial satellite, probe or vehicle type, implementing such an orbital transfer method after its separation from a launch vehicle.

The invention also relates to a method for remotely controlling a spacecraft, wherein said spacecraft is remotely controlled by a control device successively determining control signals and sending them to said spacecraft for the performance of all or part of the steps of the orbital transfer method, said device comprising at least one control system and one transmitter/receiver system based on the ground or in space.

Furthermore, the invention relates to a computer program product, that may be installed in the spacecraft, including a set of computer code instructions that, when they are executed by a processor, implement an orbital transfer method according to one or more features presented above.

The fundamental concepts of the invention having just been disclosed in their most elementary form, other details and features will become more clearly apparent upon reading the following description and with regard to the appended drawings, giving by way of non-limiting example, an embodiment of a method for optimising the orbital transfer of an electrically propelled spacecraft in accordance with the principles of the invention.

BRIEF DESCRIPTION OF THE FIGURES

The figures are given for purely illustrative purposes for the intelligence of the invention and do not limit the scope thereof. The various elements are schematically shown and are not necessarily to the same scale. In all of the figures, identical or equivalent elements bear the same numerical reference.

It is thus illustrated in:

FIG. 1a is a perspective view of a spacecraft on an initial elliptical orbit before its transfer into a final circular orbit of different inclination;

FIG. 1b is a partial plan view of FIG. 1a, the altitude of the apogee of the initial orbit being greater than the altitude of the circular orbit;

FIGS. 2a, 2b and 2c show main orbital transfer phases according to the EOR approach;

DETAILED DESCRIPTION OF EMBODIMENTS

Figure 3:
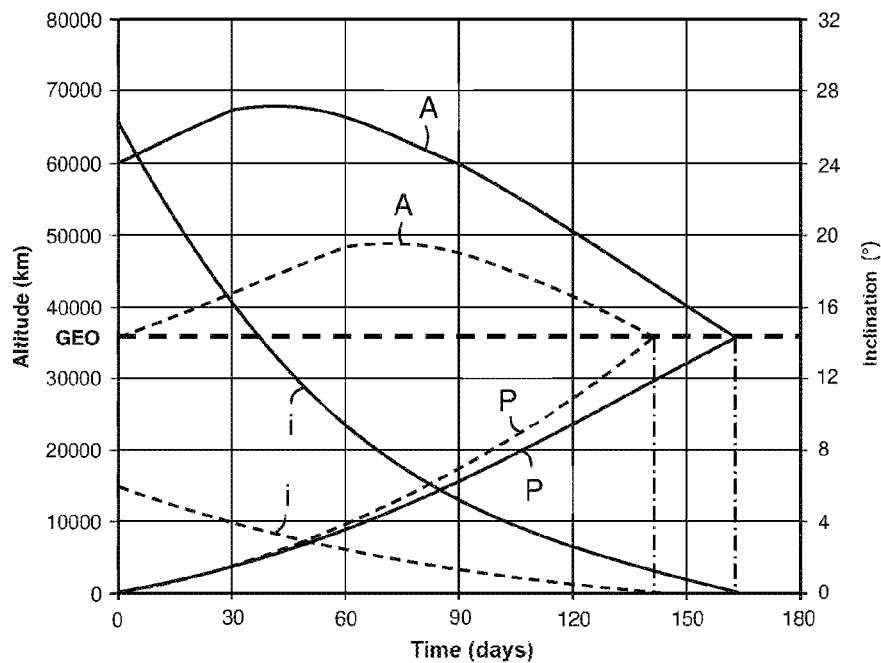
FIG. 3 is a combined graph of the temporal evolution of the orbital parameters during a typical EOR transfer.

It should be noted beforehand that certain devices, systems and methods well known to the person skilled in the art are described here to avoid any inadequacy or ambiguity in the understanding of the present invention.

In the embodiment described hereafter, reference is made to a method for optimising the orbital transfer of a spacecraft, mainly intended for an electric orbit raising of a telecommunications satellite operating in a geostationary orbit. This example, non-limiting, is given for a better understanding of the invention and does not exclude the application of the optimisation method from other types of orbital transfers, for example by hybrid propulsion (chemical and electric) from an elliptical orbit to any circular or geosynchronous orbit.

In the remainder of the description, the terms "satellite" and "transfer" designate by extension, respectively, an artificial satellite and the orbital transfer of such a satellite, within the meaning of astrodynamics. Moreover, the terminology used under no circumstances must be interpreted in a limiting or restrictive way, but simply in conjunction with certain particular embodiments of the invention.

FIG. 1a schematically shows a satellite 10 launched from a position on a celestial body 20 of dominating mass such as the Earth and injected by a launch vehicle, not shown, into an initial elliptical orbit 30, referred to as injection orbit, following predetermined launch and separation sequences depending on the parameters and on the configuration of the launch vehicle. The satellite 10 is intended to get to a final geostationary orbit 50, referred to as mission orbit, wherein it is operational, by carrying out an orbital transfer.

Only the case of "all-electric" satellites for which this orbital transfer corresponds to an Electric Orbit Raising (EOR) approach will be considered.

As soon as the separation sequence is completed, by the disengagement of the last stage from the launch vehicle at the end of combustion of the satellite 10, the latter continues, autonomously, on the injection orbit 30 that has a perigee P, an apogee A and an inclination i in relation to the plane of the targeted geostationary orbit 50. The injection is carried out at the perigee P, often in its immediate vicinity, with a certain speed that subsequently determines the altitude of the apogee A and the eccentricity of the injection orbit 30. This altitude may be greater than the geostationary altitude as clearly shown in FIG. 1b.

The EOR transfer makes it possible for the satellite to get to the geostationary orbit 50 and is accompanied with a progressive modification of the aforementioned orbital parameters.

FIGS. 2a, 2b and 2c illustrate the sequence of a conventional EOR transfer. Indeed, after the injection of the satellite 10 into its injection orbit 30 by the launch vehicle, the transfer continues autonomously with three phases: an initialisation phase (a), a stationing (transfer strictly speaking) phase (b) and an on-station mode phase (c).

The initialisation phase is between the injection and the start of the transfer manoeuvres. During this phase, the orbital parameters do not change and the systems of the satellite 10 are initialised, verified and prepared at the autonomous stationing phase. This includes, among other things, the Sun alignment mode followed by the deployment of solar panels, the orbital tests of redundancies, of the electric propulsion and of the platform of the satellite.

The stationing phase corresponds to the EOR transfer itself, during which the satellite 10 is totally autonomous, and continuously carries out the manoeuvres necessary for getting to its mission geostationary orbit 50 by passing through successive intermediate orbits 40. During this phase, the position of the satellite 10 and all of the on-board systems are inspected and remotely controlled, by telemetry or any other known means of remote communication.

Finally, the on-station mode phase corresponds to the operational evolution of the satellite 10 on its mission orbit 50, said satellite pointing towards the Earth 20. Preliminary telecommunication tests may further be performed during this phase. The optimisation method according to the invention essentially applies to the stationing phase (b) that can indifferently be combined with the EOR transfer. Before describing in detail the steps of this method, first of all it should be reminded very briefly the sequence of a conventional EOR transfer, currently used to place satellites into geostationary orbit from an elliptical orbit of different (not zero) inclination.

With reference to FIGS. 2a, 2b and 2c, the satellite 10 is initially on the injection orbit 30 that has an inclination i, corresponding to the angle formed by the plane of said orbit and the main plane 25 of the Earth 20 (equatorial plane). Subsequently, the satellite 10 progressively begins transfers between successive intermediate orbits 40 leading it to the geostationary orbit 50. Thus, the orbital parameters, namely the altitude of the apogee A, the altitude of the perigee P and the inclination i, evolve until they reach values substantially equal to those of the geostationary orbit 50. Firstly, the altitude of the apogee, initially greater than the geostationary altitude, slightly increases then secondly decreases until it reaches the geostationary altitude. This variation is accompanied with a monotonous increase of the altitude of the perigee until it reaches the geostationary altitude, in which case the orbit "becomes circular", and with a decrease of the inclination up to the value of the inclination of the geostationary orbit 50, namely 0° (orbit contained in the equatorial plane 25).

FIG. 3 is a graph of the temporal evolution of the orbital parameters during a typical EOR transfer, measured for two different launch vehicles: Ariane (curves in dashed line) and a high-inclination launch vehicle (curves in solid line). These two launch vehicles are fundamentally distinguished by the inclination of their injection orbits. The first has an inclination of approximately 6° and therefore corresponds to a so-called low-inclination launch vehicle, whereas the second has an inclination of approximately 26° and corresponds to a so-called high-inclination launch vehicle. The comparison of two launch vehicles injecting at "extreme" inclinations will be relevant in the following in the taking into account of certain phenomena, such as the passage of the satellite in the Van Allen radiation belts, for implementing the optimisation method.

In accordance with the qualitative analysis established with regards to FIGS. 2a, 2b and 2c, it is observed in FIG. 3, for the two launch vehicles, an increase then a reduction of the altitude of the apogee A up to the altitude of the geostationary orbit GEO, as well as an increase of the altitude of the perigee P to reach the GEO altitude at the same time as the altitude of the apogee, the inclination reducing for its part continuously to reach a zero inclination.

Figure 4:
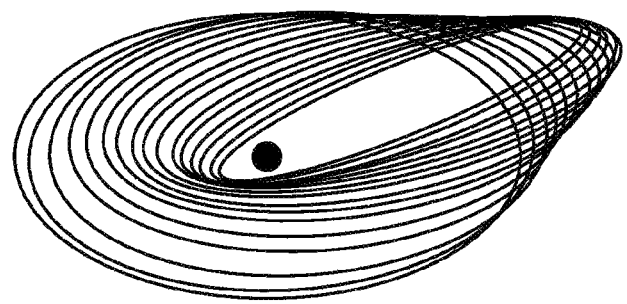
FIG. 4 is an example of possible trajectory during an EOR transfer.

In visual terms, the elliptical transfer orbits, initial 30 and intermediate 40, "become circular" and "rise" progressively to merge into the geostationary orbit 50. In view of the continuous evolution of the orbital parameters according to the directions of variation indicated, the EOR transfer corresponds to a complex spiroid trajectory about the Earth as shown in FIG. 4.

Nevertheless, the EOR transfer comprises for each transfer, injection 30 or intermediate 40 orbit, two main phases: a tangential phase and an inertial phase. The first corresponds to a propulsion mode of the satellite wherein the thrust is essentially tangential so as to increase the semi-major axis of the orbit. The second corresponds to a propulsion mode with an essentially inertial, or gravitational, thrust so as to reduce the eccentricity of the orbit. The reduction of the eccentricity up to a zero value corresponding to the final circular orbit 50 becomes clearly apparent in FIGS. 2a, 2b, 2c and 4.

Therefore, the optimisation method according to the present invention is based on the specificities of each of the aforementioned phases to ensure an optimum use of the thrusters of the satellite during the transfer, and therefore a better management of the available power, as explained below.

For the optimisation of the EOR transfer, a plurality of constraints are taken into account, the most important of which are: the maximum duration of the transfer, the maximum duration of eclipses and the minimum altitude of the start of the transfer. The maximum duration of the transfer has a direct impact on the radiation dose accumulated during the transfer. This concerns a limit not to be exceeded in order to comply with the specifications of the solar panels relating to the radiation dose received during the transfer while respecting the required margins. This limit covers the durations accumulated from the initialisation phase and from the stationing phase. Moreover, the maximum duration of the transfer also corresponds to a fixed limit to avoid any delay in the operational use of the satellite.

The maximum duration of eclipses has a thermal effect on the satellite and its equipment, and must be in agreement with the thermal qualification of the solar panels in particular.

The minimum altitude of the start of the transfer must be compatible with the permissible drag effects on the solar panels and their driving mechanisms, in accordance with the qualification of the electric thrusters in relation to the maximum ambient pressure, and in agreement with the atomic oxygen (ATOX) erosion aspects.

These main constraints make it possible to define and regulate basic operations of the optimisation method, consisting in modulating the thrust of the thrusters, and more specifically its intensity, depending on the position of the satellite on the transfer orbit. Indeed, the efficiency of the thrust generated by the propulsion system of the satellite varies depending on the position of said satellite on each elliptical transfer orbit. Consequently, a control strategy according to which the thrust varies in intensity on each intermediate orbit would make it possible to reduce the consumption of propellants in comparison with the strategies of the prior art according to which the thrust is maintained constant.

Figure 5:
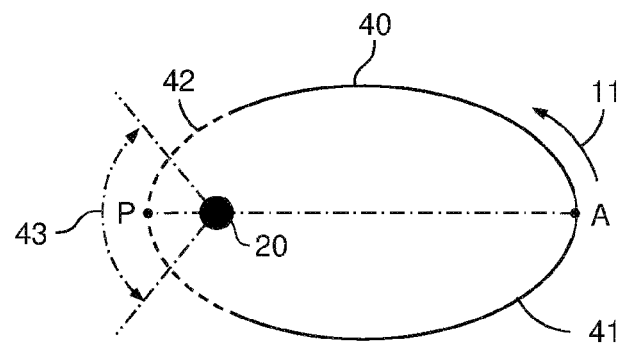
FIG. 5 is the orbital arcs, of minimum and maximum thrust efficiency, on an elliptical intermediate orbit.

FIG. 5 shows an intermediate orbit 40 on which are indicated two arcs 41 and 42 roughly delimiting the variation of the efficiency of the above-mentioned thrust. Indeed, the orbit 40 has a first arc 41, in solid line, of maximum efficiency, and a second arc 42, in dashed line, complementary to the first, of minimum efficiency, said arcs each having a symmetry in relation to the major axis of the elliptical orbit 40.

The maximum efficiency arc 41 passes through the apogee A and extends over a major part of the orbit wherein the gravitational speed of the satellite is the lowest (area rule). Thus, the effect of the thrust of the satellite is dominated less by the inertial movement of the satellite and the efficiency of said thrust is therefore maximum during this phase.

The minimum efficiency arc 42 for its part passes through the perigee P and corresponds to the part of the orbit wherein the gravitational speed of the satellite is the highest. Thus, the effect of the thrust of the satellite is dominated more by the gravitational movement. The efficiency of the thrust is therefore minimum during this phase.

Therefore and firstly, the method for optimising the orbital transfer consists in reducing the thrust of the satellite on at least one portion 43 of the minimum efficiency arc 42 and in increasing it on the maximum efficiency arc 41 so as to better use the available propulsion power and to reduce the consumption of propellants.

Starting from this principle, a particular embodiment of the method applied to a satellite will be described in detail presenting a specific, non-limiting, propulsive architecture, shown in FIG. 6.

Figure 6:
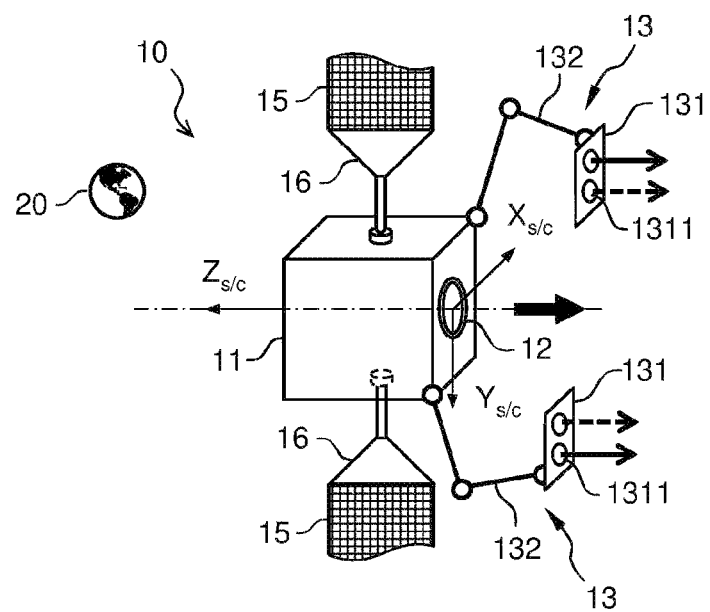
FIG. 6 is a partial view of an example of satellite for implementing the method for optimising the orbital transfer according to one embodiment of the invention.

FIG. 6 schematically shows a satellite 10 equipped with the necessary systems for carrying out an EOR transfer. This satellite mainly includes a body 11, an optional central fixed thruster 12, of fixed direction of thrust, two mobile propulsion assemblies 13, of orientable direction of thrust, and two solar panels 15 rotatably mounted along the same axis on either side of the body 11 by means of deployment mechanisms 16. The satellite 10 defines a conventional satellite marker including three axes: a Z-axis, tangential to the trajectory when the satellite is in transfer orbit (therefore parallel to the speed vector of the satellite) and radial directed towards the centre of the Earth when said satellite is in geostationary orbit, and X- and Y-axes forming with the Z-axis a direct trihedral.

The central fixed thruster 12 is a Hall-Effect Thruster (HET) and has a direction of thrust parallel to the Z-axis of the satellite 10. The satellite may include other additional fixed thrusters.

Each mobile propulsion assembly 13 includes a propulsion module 131, comprising at least one thruster 1311, and a mechanism 132 for orienting said module. The propulsion assemblies 13 are articulated on opposite faces of the body 11, for example on the North and South faces of the satellite.

More particularly, each propulsion module 131 is a plasma propulsion module, consisting of a structural plate wherein are installed the thrusters 1311 as well as mass flow controllers. This plate also ensures a thermal insulation of the thrusters and flow controllers. According to the example illustrated, each module 131 is provided with two thrusters 1311, for example a nominal thruster and a redundant thruster the thrusts of which are shown, respectively, by a continuous arrow and a dashed arrow. Furthermore, the mechanisms 132 form part of deployment and alignment systems that also provide the necessary motorisation for obtaining the required kinematics.

For the supply of the electric thrusters 12 and 13, the satellite includes tanks, not shown, adapted to receive a volume of propellants in gas form, for example xenon. Among the necessary systems making it possible, among other things, to carry out the EOR transfer, the satellite 10 comprises an Attitude Determination and Control System (ADCS) based on star sightings and used to control said satellite after its separation from the launch vehicle by means of available actuators (reaction wheels and thrusters). The ADCS also makes it possible to permanently point the solar panels 15 towards the Sun during the transfer, in such a way as to provide the necessary power to the Power Processing Units (PPU) via specific regulators. The PPU control and supply the thrusters, during their ignition, with electrical current at the required input voltage. The Hall-effect thrusters are supplied with xenon by a system for regulating the xenon pressure, which adapts the pressure at the operating point of the thrusters required during the mission.

The mechanism 132 of each propulsion assembly 13 comprises articulations each having at least one degree of rotational freedom, about different axes, so as to release all of the degrees of mobility of the associated propulsion module 131. Thus, the propulsion assemblies 13 are deployed in so-called "EOR" position during the transfer (direction of the thrust of the thrusters 1311 parallel with the Z-axis of the satellite), this position being that of FIG. 6, then in so-called "on-station" position, not shown, during the on-station mode (direction of the thrust pointing the centre of mass of the satellite).

One example of satellite 10, implementing the method for optimising the transfer, having just been briefly described, one embodiment of said method will now be presented.

Figure 7:
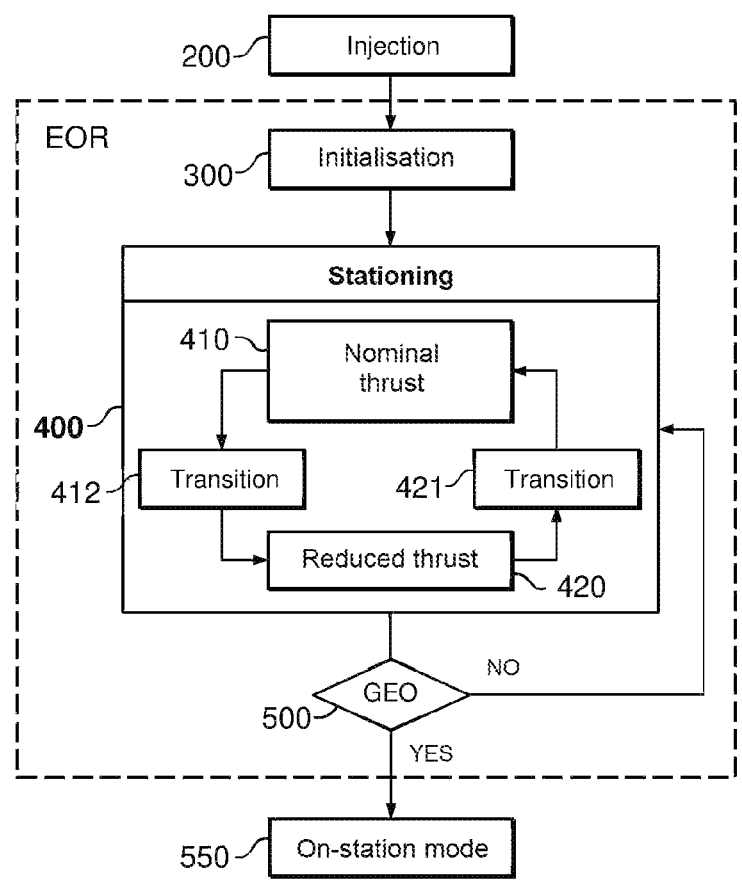
FIG. 7 is a diagram of the main steps of a method for optimising the orbital transfer according to one embodiment of the invention.

With reference to FIG. 7, the method for optimising the EOR transfer relates to the stationing phase 400, between the initialisation 300 and the on-station mode 550, and comprises the following steps according to an iterative cycle:

a nominal thrust step 410;
a transition step 412 from a nominal thrust phase to a reduced thrust phase;
a reduced thrust step 420; and
a reverse transition step 421, from a reduced thrust phase to a nominal thrust phase.

Figure 8:
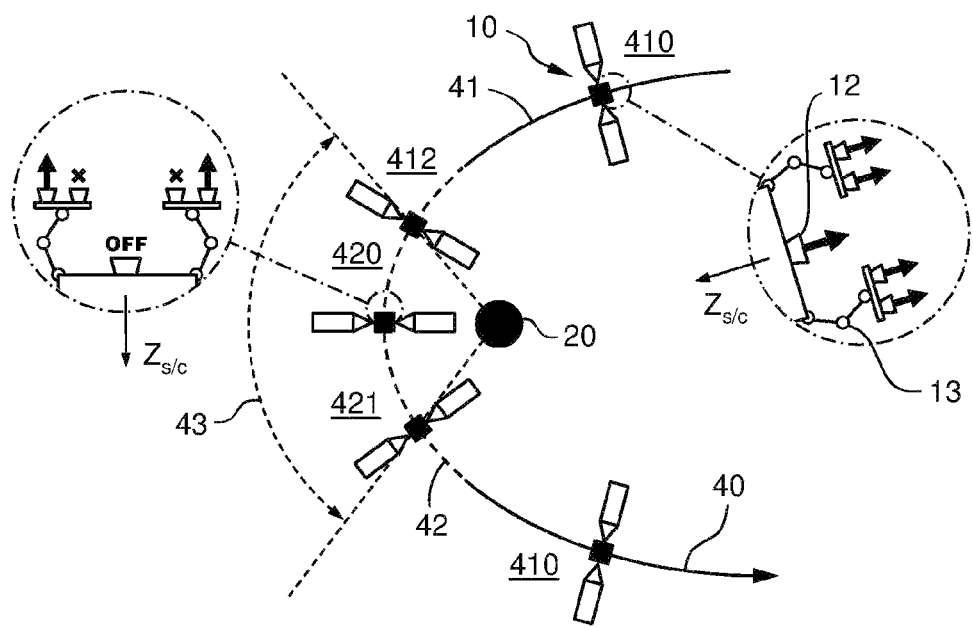
FIG. 8 shows a passage sequence of the satellite into the minimum efficiency orbital arc of an intermediate orbit.

Of course, the number of iterations needed for the satellite to get to the mission geostationary orbit is determined in the initial flight plane and the objective of this alternating sequence of propulsion modes is to optimise the xenon consumption. FIG. 8 makes it possible to illustrate the steps enumerated above implemented on a transfer orbit 40, each on a specific part of said orbit.

The nominal thrust step 410 corresponds to a continuous and simultaneous use of the thrusters of the satellite 10 at their nominal mode on the maximum efficiency arc 41. This concerns the same configuration as that of a conventional EOR transfer. This translates for the satellite 10, according to the example of FIG. 6, by a continuous and simultaneous use of at least five thrusters (the fixed thruster 12 and the two thrusters 1311 of each propulsion assembly 13) at 300 V and with a maximum thrust that corresponds to the maximum power that may be allocated to the propulsion systems.

On the other hand, the reduced thrust step 420 takes place on the minimum efficiency arc 42 and consists in using a part of the thrusters, the other part being stopped. With reference to FIG. 6, this step may be implemented by stopping the fixed thruster 12 and maintaining in operation only one thruster 1311 per propulsion assembly 13, at the 3 kW/375 V mode for example, the others being switched off. Ideally, each thruster of a propulsion assembly 13 is used periodically. For example, every two weeks, the thrusters 1311 of each propulsion assembly are alternated for the reduced thrust step 420.

The transition steps between the two thrust modes, nominal to reduced 412 and reduced to nominal 421, are carried out without any stopping of the thrusters of the propulsion assemblies. The power and the operating voltage of these thrusters are adjusted at each PPU without any interruption. At the same time as the modification of the operating mode of these propulsion assemblies, the central fixed thruster and optionally one thruster per propulsion assembly are started and stopped automatically by the on-board software.

According to this advantageous operating cycle, alternating nominal thrust and reduced thrust on each transfer orbit, the maintaining in operation of one thruster per propulsion assembly makes it possible on the one hand to conserve the capacity for discharging the reaction wheels with the propulsion assemblies and on the other hand to permanently generate a plasma that preserves the equilibrium and the electrostatic safety of the satellite and this, regardless of the external conditions (eclipse or sunshine). Consequently, the other electric thrusters of the satellite may be started or stopped without any constraints related to eclipses, in other words, the reduced thrust phases may be started or stopped without any constraints. Furthermore, the 3 kW/375 V mode was selected for the reduced thrust phases because it corresponds to the least consuming mode (the xenon flow is the lowest) while having the highest specific impulsion ($I_{sp}$).

The tests for qualifying electric thrusters make it possible to cover all aspects for implementing the optimisation method according to the invention.

For example, the multiplication of on/off (ON/OFF) cycles of the fixed thruster corresponds to the number of reduced thrust phases during an optimised transfer, this number, generally of a few hundreds of phases, is largely covered by the qualification of the electric thrusters that includes thousands of repeated on/off cycles.

Furthermore, the implementation of the optimisation method is perfectly consistent with the qualification of other systems of the satellite such as the power processing units PPU, the plasma propulsion selection units, the xenon pressure regulators, the orientable thrusters, the mechanism for driving and deploying the solar panels, the reaction wheels and the batteries.

In order to evaluate the advantages of the optimisation method, the inventors considered various cases depending on the dry mass and on the number of electric thrusters of the satellite. Among these cases, only the cases listed in the table below will be analysed in the present description:

|  | Dry mass | Number of thrusters | Nominal mode | Xenon consumption* |
|---|---|---|---|---|
| Case 1 | 3,000 kg | 3 | 4.5 kW/300 V | ~10 kg/year |
| Case 2 | 4,000 kg | 3 | 4.5 kW/300 V | ~15 kg/year |
| Case 3 | 4,000 kg | 5 | 4.5 kW/300 V | ~15 kg/year |
| Case 4 | 5,500 kg | 5 | 4.5 kW/300 V | ~21 kg/year |

*During the on-station mode phase of the satellite.

It should be noted that the operating mode entered corresponds to the nominal thrust phase and that during the reduced thrust phases, the thrusters of the mobile assemblies operate at 3 kW/375 V.

For obvious reasons of simplification, only the Ariane launch vehicles have been considered with, for all cases, the same separation parameters (6°/250 km/35,786 km). However, the optimisation method remains applicable to any launch vehicle, in particular to the launch vehicles currently used for the placing in orbit of telecommunications satellites. The inventors noted the following points of concordance and of similarity: the experience already acquired showed very similar results for the high-inclination launch vehicles and the Ariane launch vehicles, even if the optimisation in the case of high-inclination launch vehicles is slightly less attractive since the EOR phase with such launch vehicles is generally longer; the Ariane launch vehicles were preferred because they offer during the EOR phase the highest radiative environment and the radiative impacts related to the implementation of the optimisation method must be mastered; other launch vehicles offer the possibility of applying similar strategies and are also concerned by supplementary cases that the inventors included in their study.

Thus, the various comparisons have made it possible to establish that the results obtained, some of which are presented hereafter, remain perfectly valid for high-inclination launch vehicles and that the optimisation strategies according to the invention make possible in these cases a surprising prolongation of the life of the satellite of 4 years (compared to 6 years in low-inclination cases), of course a little less attractive but just as considerable.

In all of the cases 1 to 4, the optimisation of the EOR transfer was calculated by assuming a minimum duration strategy then an extension of the duration of said EOR transfer of 7, 14, 21 and 28 days according to a so-called minimum consumption strategy. These data were used in the dynamic calculations for the flight in addition to the data of the preceding table. The extension of the duration of the EOR transfer was limited to 28 days. It was assumed that a longer duration is not desirable for the end customers because it would considerably delay the start of the operational phase of the satellite. For all of the cases, the xenon tank is loaded for a life of 15 years.

Figure 9A:
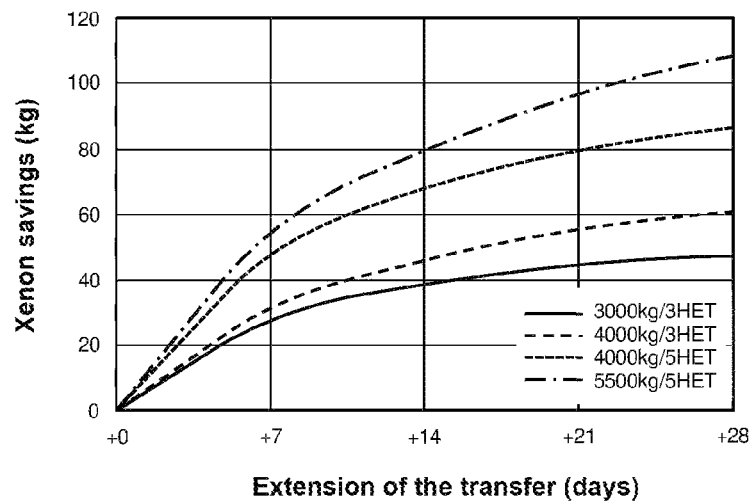
FIG. 9a shows curves of xenon savings obtained by implementing the optimisation method in various cases.
Figure 9B:
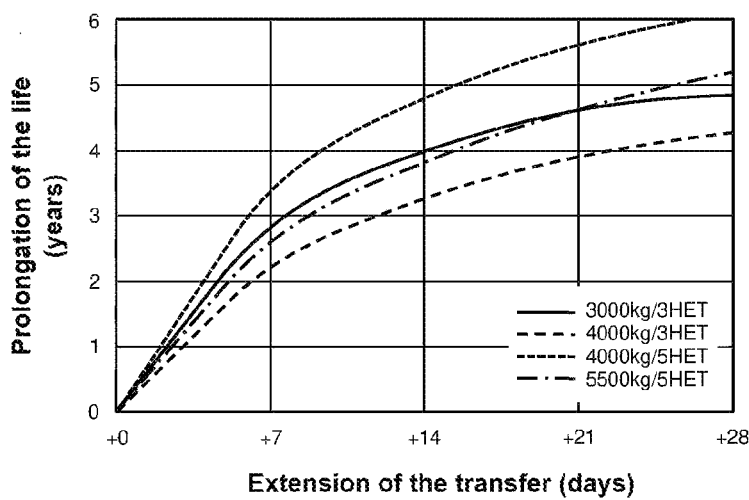
FIG. 9b shows curves of the prolongations of lives obtained by implementing the method in various cases.

The main advantages of the optimisation method are illustrated by the graphs of FIGS. 9a and 9b that show, respectively, the xenon savings and the prolongation of the life depending on the various extensions of the duration of the EOR transfer, obtained for each case.

Concerning the optimisation of the transfer depending on the number of thrusters exploited simultaneously during the nominal thrust phases, FIGS. 9a and 9b clearly show the interest of using more thrusters simultaneously during these phases. For an extension of 7 days, the addition of two thrusters (case 2 vs case 3) makes it possible to prolong the life by approximately one year, and by approximately two years for an extension of 28 days. To a lesser extent, the addition of one supplementary thruster during the high thrust phases makes it possible to increase the life by approximately one year for an extension of the transfer of 28 days, this result not being shown.

Figure 10:
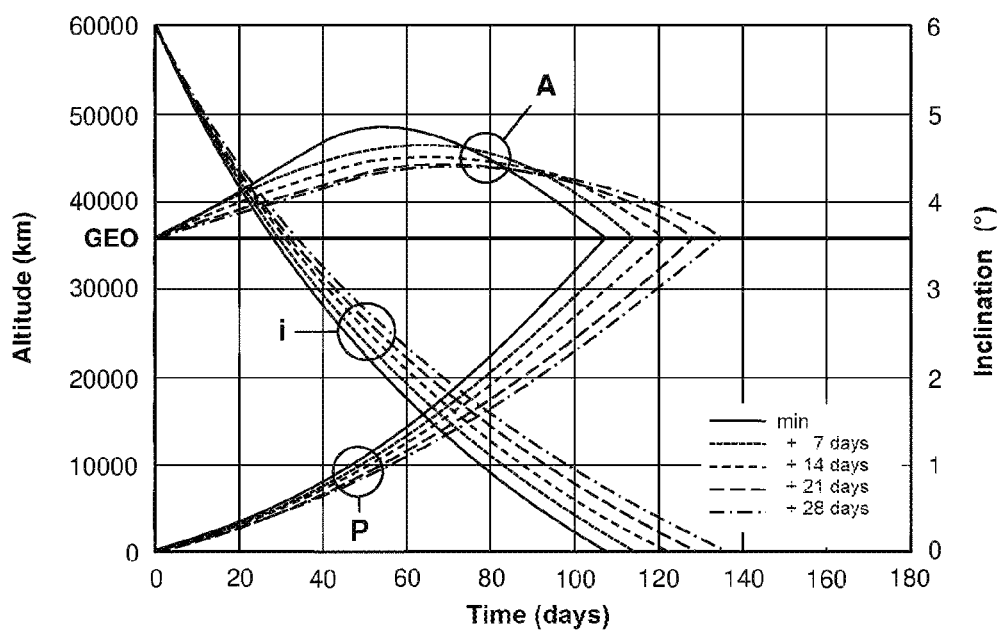
FIG. 10 shows the curves of temporal evolutions of the orbital parameters obtained by implementing the method according to the invention.

FIG. 10 for its part shows the temporal evolution of the orbital parameters (altitude of the apogee A, altitude of the perigee P and inclination i) for the various extensions of the EOR transfer (+7, +14, +21 and +28 days). The extension of the duration of the EOR transfer tends to reduce the maximum altitude of the apogee during the EOR phase (flattening of the apogee altitude curves). This consequence may be explained by the fact that the reduced thrust phases take place, during the first half of the EOR transfer, essentially in the perigee part of each transfer orbit where the apogee altitude is increased by the thrust.

It should be noted that the extension of the duration of the EOR transfer implies a modification of the radiative environment of the satellite, particularly during passages in the Van Allen radiation belts.

Results obtained by the inventors confirm that the environment defined for a conventional EOR approach covers all of the possible optimised approaches, with any type of launch vehicle, regardless of the number of thrusters exploited simultaneously and regardless of the optimisation strategy: minimum time or minimum consumption.

For cases 1 to 4 described in detail above, corresponding to the critical cases of Ariane launch vehicles for which the radiation doses of the solar panels are the highest, the implementation of the method for optimising the EOR transfer with a minimum xenon consumption strategy may prove to be problematic due to extensions of the duration of said transfer and, thereby, of the duration of the passages in the areas of intense radiation.

A combined strategy was therefore put in place to counteract this problem according to the configuration described below with reference to FIG. 11.

Figure 11:
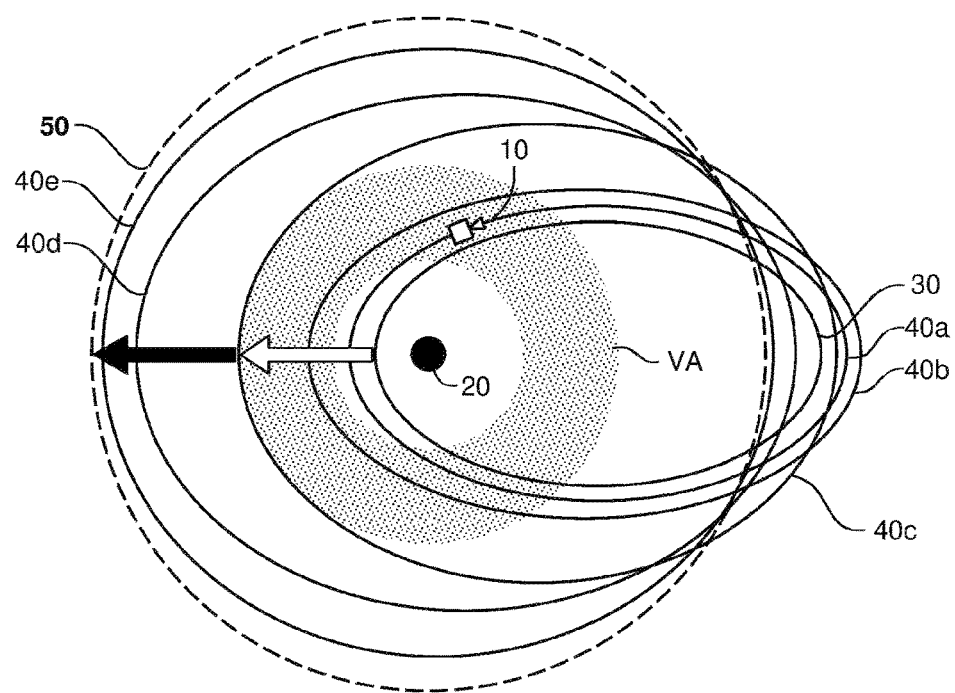
FIG. 11 shows the principle for applying the method of the invention according to a hybrid strategy adapted to low inclination launches in the presence of areas of intense radiation.

After the separation and up to a perigee altitude of approximately 12,000 km, the satellite 10, on low-inclination orbits, passes regularly twice per orbit in the Van Allen (VA) belts, this is particularly the case of the injection orbit 30 and of the intermediate orbit 40a in FIG. 11. In order to reduce this critical period as much as possible, an EOR strategy of minimum duration is applied until the altitude of the perigee of the orbit of the satellite exceeds the maximum altitude of the VA belts. This first phase is indicated by a solid white arrow in FIG. 11, the crossing of the VA belts (exceedance of their maximum altitude) corresponding to the intermediate orbit 40c. Putting in place the minimum duration strategy upstream of the VA belts is all the more relevant when certain intermediate orbits 40b mark a prolonged passage (without exiting) into said belts, which exposes the satellite to a higher dose of radiation.

Once the critical altitude limit of the perigee has been reached (orbit 40c), the strategy is modified and a minimum consumption EOR strategy is applied until the end of the EOR transfer, in other words until the arrival in geostationary orbit 50. This second phase is indicated by a solid black arrow in FIG. 11.

Figure 12:
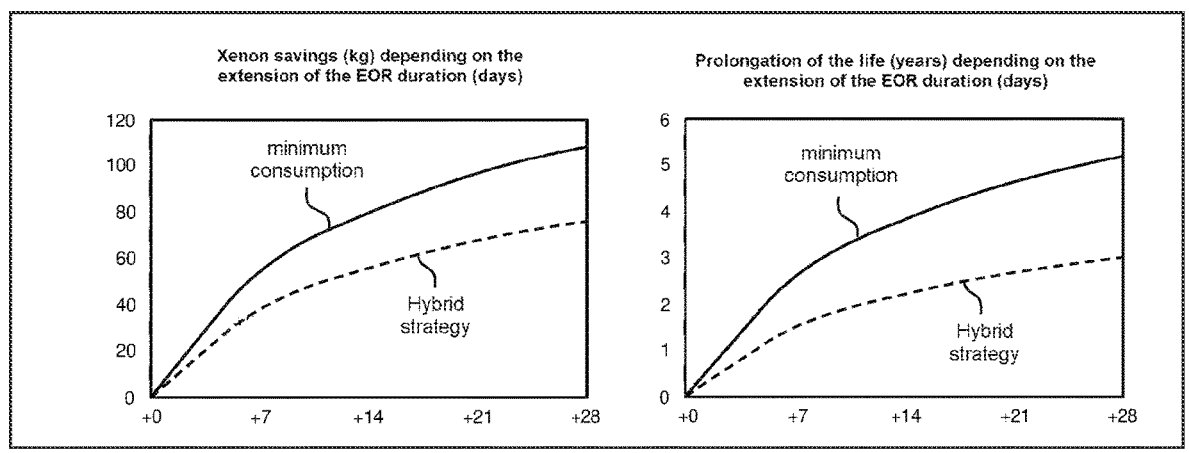
FIG. 12 shows a comparison of the curves of xenon savings and prolongation of the life between a minimum consumption strategy and a hybrid strategy.

Therefore, this concerns a "hybrid" strategy, adapted to low-inclination launch vehicles due to their prolonged passage in the Van Allen belts, which was evaluated by the inventors on the most critical cases in terms of radiation and which transpired to bear results just as advantageous as those of the minimum consumption strategy. FIG. 12 shows that the xenon savings and the prolongation of the life obtained by applying the hybrid strategy remains very advantageous. The life may for example be prolonged by 3 years.

In addition, the increase of the radiation dose receive by the solar panels of the satellite is significantly reduced thanks to the hybrid strategy compared to the minimum consumption strategy, approximately 7% compared to 30%.

The evolution of the orbital parameters during the application of the hybrid strategy made it possible to observe that the altitude of the apogee, for each case studied, increases less than with a minimum duration strategy, but more than with a minimum consumption strategy.

The other results of the hybrid strategy present no undesirable effects for the satellite or for its mission.

The results of this hybrid strategy have therefore made it possible to establish, in conjunction with a minimum consumption, a general approach distinguishing the launch cases according to their inclinations.

For the high-inclination launches, where the xenon consumption during the EOR transfer is generally high (compared to the Ariane cases) but where the radiation dose received by the solar panels is low, the use of minimum consumption EOR strategies is recommended in order to maximise the xenon savings without major negative effects.

For the low-inclination launches (such as the Ariane cases) for which the xenon consumption is lower than the preceding cases but where the radiation dose received is much higher, a hybrid EOR approach with a minimum duration EOR strategy at the start and a minimum consumption EOR strategy subsequently is preferable.

Furthermore, for the particular case of certain high-inclination launch vehicles with an apogee altitude just above 27,000 km, the question of xenon mass is critical and requires adopting a minimum consumption strategy. The radiation doses remain compatible with the permissible dose.

The choice of one strategy or another must be analysed for each mission, depending on various constraints, and adapted, as required, to achieve the targeted optimisation.

The optimisation method according to the invention does not have supplementary vulnerability regarding events encountered in the space environment in relation to a conventional EOR transfer. The management of high-risk events like the collision of debris or micrometeorites, toxic oxygen erosion, and others, may be performed with the same strategies as those applied in the case of conventional EOR transfers, known by the person skilled in the art, the objective here not being to exhaustively list the verifications and validations of the various mission aspects concerned by the implementation of the present invention.

The application of the optimisation method does not imply major modifications or disturbances of the operations for inspecting and controlling the spacecraft mission. The points having caused certain difficulties to the inventors also gave rise to innovative improvements.

More particularly, when the duration of the EOR transfer is prolonged up to 28 days, the percentage of time during which the reduced thrust is applied may rise up to 52% of the total duration of said transfer. In addition, when the thrust applied during the nominal thrust phase can be increased, the optimisation method becomes increasingly effective with very advantageous prolongations of the life (approximately one year more when a supplementary thruster can be used at 4.5 kW).

These two results may be combined to reinforce the proposed approach. Thus, when the satellite is exploited at low thrust, the power margins become important and the satellite may store energy that may be used during the high-thrust phases in addition to the nominal power available during steady state.

Thanks to this configuration, the power allocated to the electric thrusters during the high-thrust phases increases and consequently makes it possible to increase the total thrust of the satellite during said phases. The duration of the EOR transfer may therefore be shorter and more effective in terms of xenon consumption (the difference of thrust between the low thrust and the high thrust is increased).

It is important to note that the fundamental point of this new strategy is the storage of energy during the reduced thrust phases, that is to say during step 420 of the method. This storage may be carried out either with the battery, in which case said battery is charged to a high level during the reduced thrust phases and provides an energy support to the solar panels during the high-thrust phases, i.e. with the thermal inertia of the satellite. Indeed, for this last alternative, the remaining power margin during the low-thrust phases may be used to superheat the satellite above the minimum operating temperature. Consequently, upon starting the high-thrust phase, the thermal control loops are reset to the minimum operating temperature, this resetting causes the thermal heaters to stop during the period where the temperatures decrease but remain higher than the control points. The energy thus saved may be reassigned to the electric thrusters.

Finally, it becomes clearly apparent from the present description that certain steps and operations of the method for optimising the electrically propelled orbital transfer may be adapted, modified or replaced, without in as much departing from the scope of the invention, defined by the claims.

The invention claimed is:

1. A method for transferring a spacecraft from an initial elliptical orbit to a final orbit of said spacecraft about a body of dominating mass, said spacecraft taking at least one intermediate elliptical orbit, propelled by an electric propulsion means, wherein the method comprises:
   when the spacecraft is in an intermediate elliptical orbit,
      a nominal thrust step, wherein said propulsion means generates a nominal thrust while said spacecraft is on at least one part of a first orbital arc passing through the apogee of said intermediate elliptical orbit, and
   a minimum thrust step during which a solar array charges an electric battery on the spacecraft and the propulsion means generates thrust at a level below the nominal thrust, wherein the minimum thrust step is performed while said spacecraft is on at least one part of a second orbital arc passing through a perigee of said intermediate elliptical orbit,
   wherein the first orbital arc and the second orbital arc together form the intermediate elliptical orbit,
   wherein during the nominal thrust step, energy stored in the electrical battery is applied to generate the nominal thrust, and wherein after the charging of the electric battery, energy generated by the solar array is applied to heat said spacecraft to save energy during a resetting of a thermal control operation performed during the nominal thrust step.

2. The method according to claim 1, wherein the electric propulsion means include:
at least one fixed thruster, generating a thrust of direction parallel to a Z-axis related to the spacecraft and tangential to a trajectory of said spacecraft during a transfer, and
at least two deployable propulsion assemblies, generating a thrust of orientable direction and each of the at least two deployable propulsion assemblies including at least one thruster, and wherein the minimum thrust step includes stopping any fixed thruster and maintaining in operation one thruster per deployable propulsion assembly.

3. The method according to claim 1, wherein the first orbital arc and the second orbital arc of each of the at least one intermediate elliptical orbit have a symmetry in relation to a major axis of said intermediate elliptical orbit, the first arc having a length greater than that of the second arc.

4. The method according to claim 1, further comprising a first transition step from the nominal thrust step to the minimum thrust step and a second transition step from the minimum thrust step to the nominal thrust step.

5. The method according to claim 1, implemented by the spacecraft iteratively on a plurality of successive orbits of the intermediate elliptical orbits while said spacecraft has not reached the final orbit.

6. The method according to claim 1, wherein the spacecraft is a telecommunications satellite configured to be operational in a geostationary orbit, the method further comprising said telecommunications satellite initially being placed in an injection orbit of non-zero inclination by a launch vehicle, and a transfer of said satellite from the injection orbit to the geostationary orbit is performed via an Electric Orbit Raising approach.

7. A computer program product including a set of program code instructions that, when executed by a processor, implement the method according to claim 1.

8. A spacecraft including a computer program product according to claim 7.

9. A method for remotely controlling the spacecraft according to claim 8, wherein said spacecraft is remotely controlled by a control device successively determining control signals and sending the control signals to said spacecraft for performance of the steps of an orbital transfer method, said device comprising at least one control system and one transmitter/receiver system based on the ground.

10. The method of claim 1, wherein the propulsion means includes an electric thruster.

11. A method for transferring a spacecraft from an initial elliptical orbit to a final orbit of said spacecraft about a body of dominating mass, the method comprises:
when the spacecraft is in an intermediate elliptical orbit, a nominal thrust step, wherein an electric thruster on the spacecraft generates a nominal thrust while said spacecraft is on a first orbital arc, wherein the first orbital arc passes through the apogee of the intermediate elliptical orbit, and
a minimum thrust step during which a solar array on the spacecraft charges an electric battery on the spacecraft and the electric thruster generates thrust at a level below the nominal thrust, wherein the minimum thrust step is performed while the spacecraft is on a second orbital arc, wherein the second orbital arc passes through a perigee of said intermediate elliptical orbit,
wherein the first orbital arc and the second orbital arc together form the intermediate elliptical orbit,
wherein during the nominal thrust step, energy stored in the electrical battery is applied to generate the nominal thrust, and
wherein after the charging of the electric battery, energy generated by the solar array is applied to heat the spacecraft.

* * * * *